INVENTOR.
Maurice Stubnitz
BY
Barnes, Kisselle, Laughlin Raisch,
Attorneys.

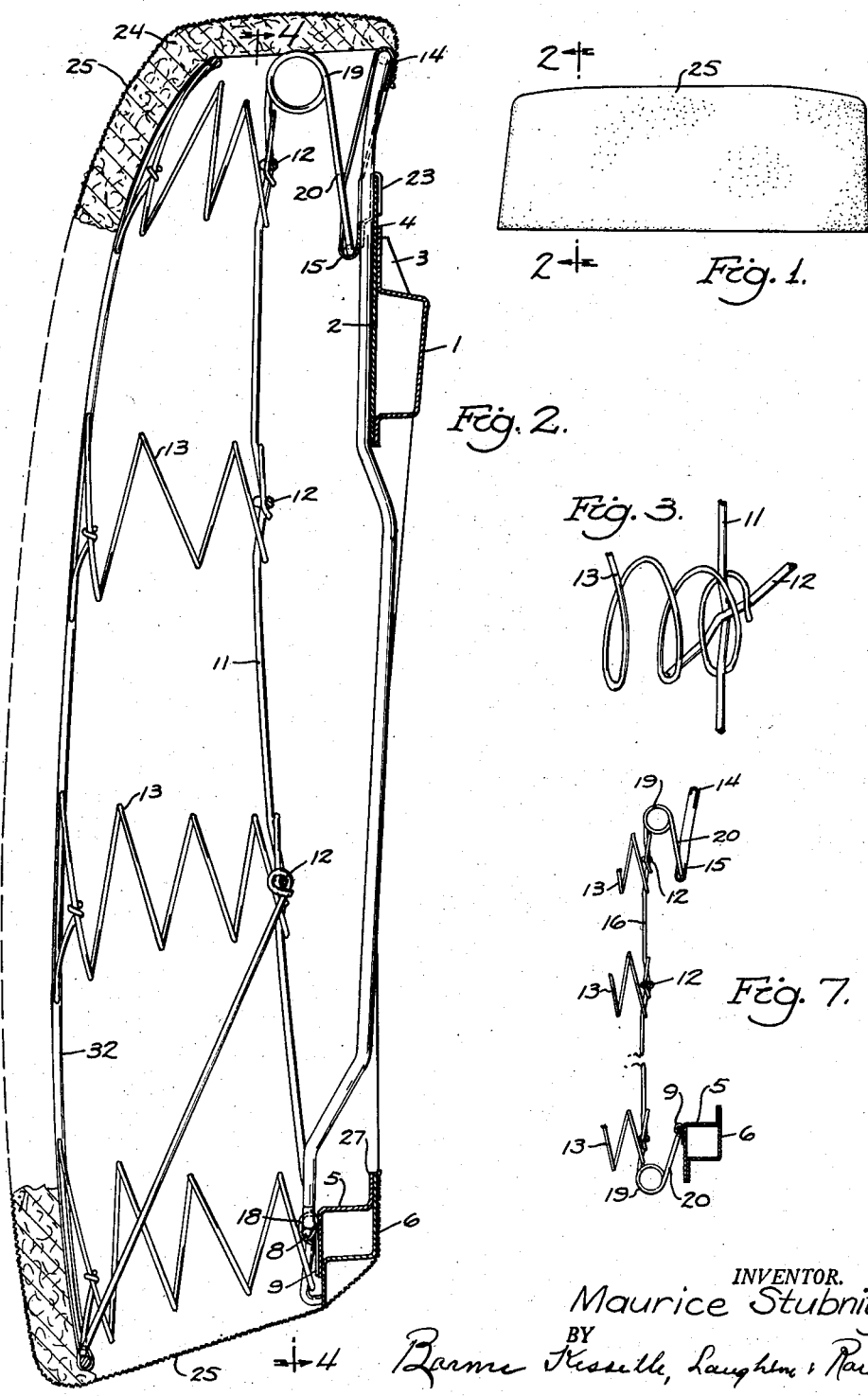

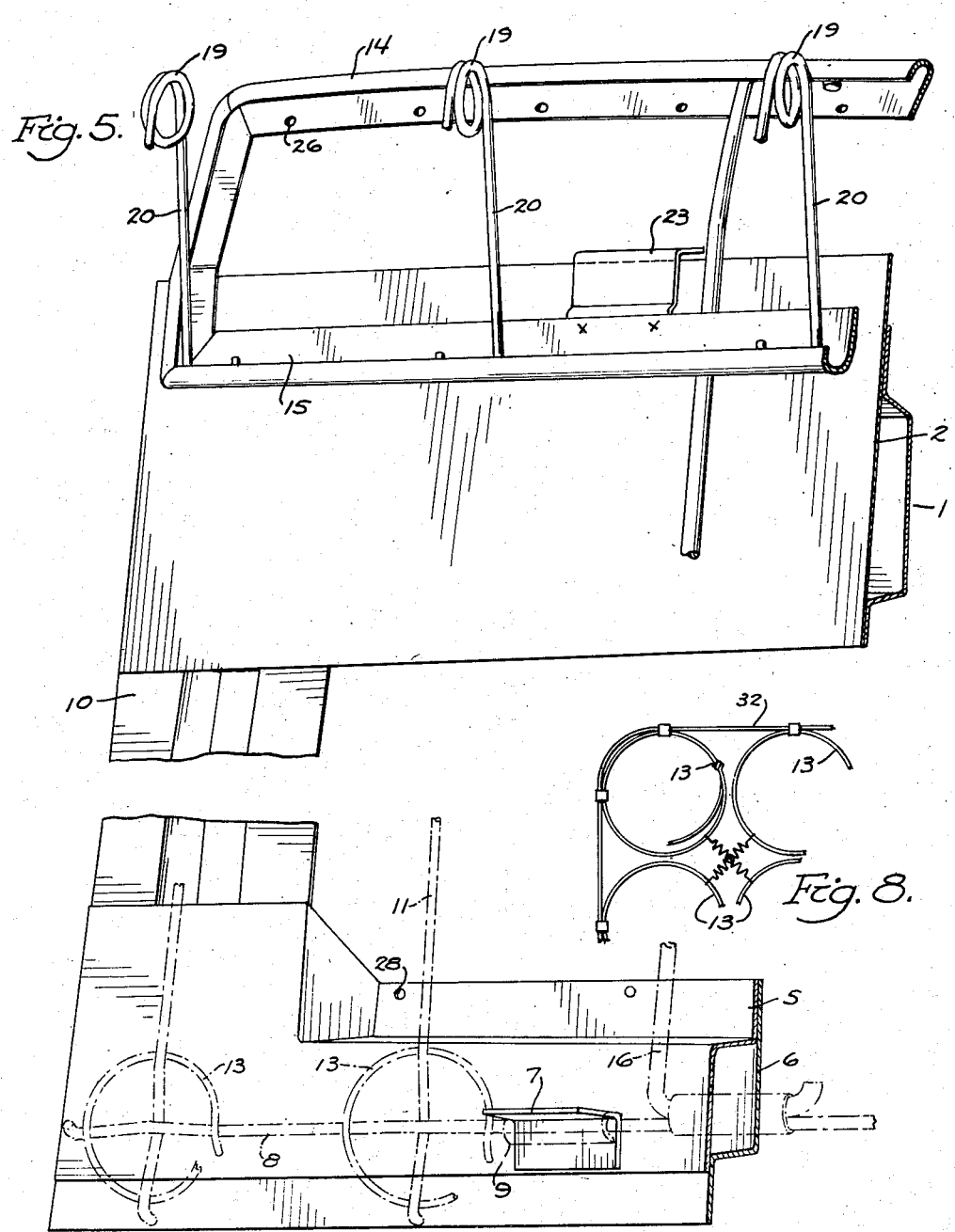

Patented Aug. 25, 1953

2,649,895

UNITED STATES PATENT OFFICE 2,649,895

SEAT BACK SPRING

Maurice Stubnitz, Adrian, Mich., assignor to Stubnitz-Greene Spring Corporation, Adrian, Mich., a corporation of Michigan Application November 16, 1949, Serial No. 127,574

3 Claims. (Cl. 155—179)

This invention relates to seat back spring cushions and it is the object of the invention to provide a seat back spring more economical than the usual full depth coil spring seats, but which can compete in price with the zig-zag or wavy wire seat springs and afford greater riding comfort.

A further object of the invention is to provide a seat back spring in which a part of the spring structure is afforded by short length coil springs and the rest of the seat back structure is afforded by spring beams which support the short length coiled springs in spaced but yieldable relation to the seat back itself. This is done by using, at the top of the spring seat, safety pin or jack springs which space the wire mat to which the rear ends of the coil springs are secured from the seat back.

Another feature of the invention is that the jack or safety pin spring ends are secured in a J strip into which they are pinched and secured. The ends of the uprights which form the back of the cushion are secured in another J frame which also acts as an anchor for the trim material which may be pulled over the upper J strip and secured by hog rings in openings in the strip. The seat back cushion may be secured to the seat back frame by tabs that hang the seat back spring on the top of the seat frame. A further feature of the improved seat back spring is that the spring beams in connection with the jack springs have different amplitudes and periods of vibration than the coil springs so that the action of one set of springs dampens out the vibration of the other set so as to give a more comfortable riding where the road action is rough.

Referring to the drawings:

Fig. 1 is a small front elevation of the seat back cushion.

Fig. 2 is an enlarged cross section of the seat back cushion taken on the line 2—2 of Fig. 1.

Fig. 3 is a detail of the fastening of the coil spring to the spring beam and cross wire.

Fig. 5 is a detail of the top of the seat back cushion and a part of the seat back frame showing how one can be fastened to the other.

Fig. 6 is a fragmentary view of the lower left hand corner of the seat back frame showing how the spring is fastened in place by means of tabs.

Fig. 7 is an enlarged vertical cross section of an alternative form of the invention.

Fig. 8 is a fragmentary plan view of the front face of the seat back cushion.

Figure 4:
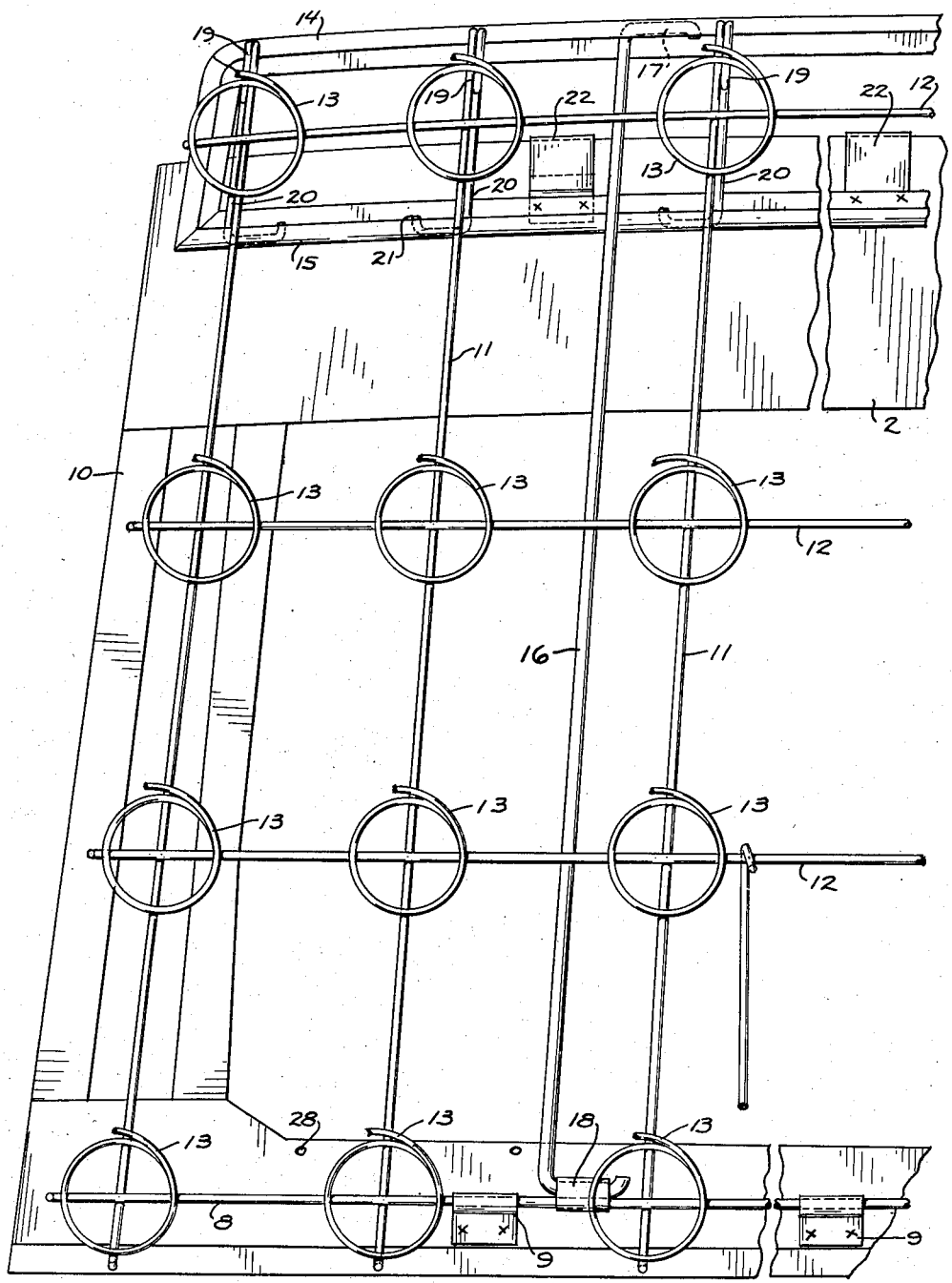
Fig. 4 is a fragmentary plan view of the improved seat back spring.

The seat back frame is provided by the car manufacturer and consists of a box section frame member at the top made up of the channel 1 and the strip 2 that are spot welded together. The strip 2 extends at the top beyond the flange 3 of the channel 1 and forms a flange 4 over which the seat back spring is to be hooked in a way hereinafter to be described. At the bottom of the seat back frame are a pair of Z bars 5 and 6 which are spot welded together to form a box section frame member. The Z bar 5 is provided with struck out tabs 7 to be turned over the cross wire 8 as shown at 9 in Fig. 6. The upper box-like frame member 1—2 is secured to the lower box-like frame member 5—6 by sheet metal side members 10. These members 10 are spot welded to the top bar and the bottom bar of the frame. This completes the seat back frame structure which is furnished by the car manufacturer.

The spring manufacturer furnishes the seat back spring which is designed to be secured in place on this particular seat back frame. The back of the seat has a plurality of spring beams 11 which are united by floating cross wires 12 to the coiled springs 13 of relatively short or cut-off length. These are called "floating" because their two ends are entirely free and the wires are free to move forwardly and rearwardly. It will be noted that the springs of the upper two rows are approximately half the normal length of spring. They are connected together at their center ends by a border frame of wire 32. At the top of the seat back spring is provided a narrow J bar rectangular frame which consists of the upper J bar 14 which is looped over at the ends and welded to the lower J bar 15. The open channels of the two J bars face each other. The lower J bar channel 15 opens upwardly and the upper J bar channel 14 opens downwardly. This J bar frame is connected with the lower cross wire 8 by means of the strong stay wires 16 of heavy gauge. They are turned over at the upper ends and pinched in the upper J frame at 17. They are turned over at the lower ends and clipped by clip 18 to the lower cross wire 8. Only three or four of these wires need be used to bridge from the lower cross wire 8 to the upper J frame. This makes a cheap skeletonized base structure for the seat back spring.

The spring beams 11 which support the coil springs 13 have their ends formed into jack or safety pin springs 19. The rearward leg 20 of this safety pin spring has a bent over end 21 which is engaged in the bill of the lower J frame and staked in place. The metal tabs 22 are spot welded to the lower J frame and they have the turned over wings 23 which are shown open in Fig. 5 and which may be turned down to engage over the top edge of flange 4 of the top seat frame, therefore locating the seat back spring on the seat frame. This forms a simple and effective way to hang the seat back on the seat frame.

The upholstering 24 is covered by trim material 25 which is secured to the top J frame through openings 26. The upper edge of the trim material may be drawn over the upholstery 24 and then over the J frame and the material secured to the J frame by hog rings (not shown) that clamp through the perforations 26 in the upper J frame. The trim material 25 at the bottom is drawn over the lower edge of the seat back frame and secured to the frame itself by hog rings (not shown) that can be clamped through perforations 28 in flange 27 of the lower box section frame.

The spring beams 11 and floating cross wires 12 which are knotted into the lower whirls of the coiled supporting springs 13 form a hinged latticed mat which hinges at the bottom on the clipped connections of the upright stay wires with the lower cross wire 8, while the jack springs at the top of the spring seat back freely give way and yieldingly oppose this hinging action. However the periods of vibration and the amplitude of vibration of the coiled springs on the latticed mat and the flexible beams and the jack spring are quite different, hence there is a dampening and snubbing action which avoids too violent throw of the springs while riding over a rough road.

In some cases it may be found desirable to use the safety pin springs at the bottom of the cushions as well as the top, as shown in Fig. 7, or it may be desirable to use the safety pin spring only at the bottom of the cushion.

What I claim is:

1. A seat back spring having a combination upright spring beams terminating at least one end in safety pin springs, and having floating cross members crossing the spring beams and forming therewith a latticed mat, short coil springs locked into the latticed mat at the intersections of the beams and cross members and held projecting from said mat, a border frame surrounding said coiled springs at the outer ends of the springs, a base frame to which the safety pin springs are anchored, the said base frame comprising several upright stiff wires connected together at one end by a cross wire and connected together at the other end by means of a rectangular frame to one bar of which is connected the legs of the safety pin springs and to the opposite bar of which is connected the stiff upright wires.

2. The combination claimed in claim 1 in which several of the stiff upright wire members have turned-over legs at the top of said seat spring and in which the rectangular frame member located at the top is made of upper and lower bars of J section in which the lower frame bar is engaged with the ends of the safety pin spring and the upper J bar is pinched over the turned-over ends of the upright stiff wire members.

3. The combination claimed in claim 2 in which tabs that are welded to the lower J bar member receive the lower cross wire of the seat back cushion and the tabs are turned over to anchor the cushion at the bottom.

MAURICE STUBNITZ.

References Cited in the file of this patent

UNITED STATES PATENTS

| Number | Name | Date |
|---|---|---|
| 742,251 | Staples | Oct. 27, 1903 |
| 748,433 | Staples | Dec. 29, 1903 |
| 813,923 | Staples | Feb. 27, 1906 |
| 1,915,390 | Steele et al. | June 27, 1933 |
| 2,217,290 | Nordmark | Oct. 8, 1940 |
| 2,265,251 | Reed | Dec. 9, 1941 |
| 2,570,409 | Van Hove | Oct. 9, 1951 |